United States Patent

Hartman

[15] 3,665,365

[45] May 23, 1972

[54] MULTI-IMPEDANCE ELECTRICAL COMPONENT

[72] Inventor: Clinton W. Hartman, Elkhart, Ind.

[73] Assignee: CTS Corporation, Elkhart, Ind.

[22] Filed: Feb. 8, 1971

[21] Appl. No.: 113,759

Related U.S. Application Data

[63] Continuation of Ser. No. 741,720, July 1, 1968, abandoned.

[52] U.S. Cl. ....338/190, 338/195

[51] Int. Cl. ....H01c 5/06

[58] Field of Search ....338/185, 188, 190, 191, 192, 338/193, 194, 200, 201; 200/15

[56] References Cited

UNITED STATES PATENTS

| | | | |
|---|---|---|---|
| 2,597,674 | 5/1952 | Robbins | 338/195 X |
| 2,632,830 | 3/1953 | Aust et al. | 338/190 X |
| 2,678,985 | 5/1954 | Smith, Jr. | 338/191 X |
| 2,688,679 | 9/1954 | Schleuning | 338/190 |
| 2,988,606 | 6/1961 | Allison | 200/15 |
| 3,161,850 | 12/1964 | Klug | 338/195 |
| 3,379,567 | 4/1968 | Wright | 338/195 X |

*Primary Examiner*—Thomas J. Kozma
*Attorney*—John J. Gaydos

[57] ABSTRACT

Multi-impedance electrical component having an impedance selecting means assembled with at least one circuit wafer supporting a plurality of operationally discrete film type impedance elements, i.e., film type elements supported in groups on the wafer to form a single integrated mechanical structure, the film type impedance elements being useful in an electrical circuit in lieu of structurally independent resistors, capacitors, and inductors. Film type conductive interconnectors are connected with the operationally discrete impedance elements and a conductive contactor forming part of the impedance selecting means is movable to different contact positions for completing an electrical connection with selected ones of the conductive interconnectors. An indexical detent mechanism cooperates with a shaft for selectively changing the position of the conductive contactor, operation of the shaft causing one or more of the operationally discrete impedance elements to be connected in a circuit between termination points on the wafer. The wafer is formed of heat resistant material, and the operationally discrete impedance elements are formed from film type material and are precisely adjusted to a nominal impedance value by removing portions of the film from the surface of the wafer.

8 Claims, 8 Drawing Figures

Patented May 23, 1972 3,665,365

INVENTOR

CLINTON W. HARTMAN

BY John J. Gaydos

ATTORNEY

MULTI-IMPEDANCE ELECTRICAL COMPONENT

This application is a continuation of application Ser. No. 741,720 filed July 7, 1968, now abandoned.

This invention relates generally to an improved electrical component and, more particularly, to an electrical component of the type wherein an impedance selecting means such as a switch is operable to selectively change the impedance between termination points on the component.

When using various types of electrical and electronic apparatus, it is often desirable to change the impedance of an electrical component within the apparatus in order to obtain a desired result or measurement. Illustrative types of such apparatus include transmitting and receiving equipment, industrial process control equipment, and laboratory and test equipment such as impedance substitution boxes and oscilloscopes. The electrical components used heretofore for effecting selective impedance changes have included multi-position switches having a plurality of terminals and a number of discrete circuit elements such as resistors, capacitors, or inductors connected thereto. As a general practice, lead wires of the discrete circuit elements have been manually connected to one or more terminals of the switch and an appropriate point in the circuitry of the apparatus. This use of discrete circuit elements connected to the terminals of a switch is illustrated in a large body of prior art, generally typical examples of which are U.S. Pat. No. 3,281,658 issued on Oct. 25, 1966, to Magid and U.S. Pat. No. 3,200,211 issued on Aug. 10, 1965, to Corey.

When the teachings of the prior art have been followed, many problems have been encountered. Some of these problems have been related to the necessity for manually completing complex interconnections between the switch and discrete circuit elements; the difficulty of testing individual parts of the switch and the discrete dircuit elements; the time and effort required to test and repair the component in the field; and, in applications requiring the circuit elements to have relatively precise impedances, the difficulty of economically obtaining precision discrete circuit elements and maintaining the precision of the circuit elements relative to one another when environmental conditions change over a period of time. In an effort to overcome at least some of the problems in the art, one of the techniques employed has been to mount several discrete impedance elements on a printed circuit board and then assemble a rotary selector switch with the impedance elements by plugging terminals of the switch into appropriate apertures in the circuit board. With this arrangement, interconnections between the switch terminals and impedance elements have been provided by circuitry printed on the board. Although this approach has been successful in some applications, new problems associated with the use of relatively large printed circuit boards have been created and many of the problems long recognized in the art have remained unsolved.

For example, the difficulty of economically fabricating a component having discrete impedance elements has continued to be a problem in the industry. This has been at least partly due to the need to manually complete a large number of interconnections between the impedance elements, the switch, and the circuit board or other circuitry of the apparatus incorporating the impedance changing component. In addition, apparatus utilizing such components has, at times, required modification or repair in the field. In these cases, it has usually been necessary for skilled personnel to inspect and test the discrete impedance elements and to replace any defective impedance elements with appropriate replacement impedance elements.

In high precision multi-impedance components it is necessary that each impedance element have, within prescribed tolerances, a predetermined value of impedance. It is difficult and expensive in practice, however, to obtain a plurality of discrete volumetrically fixed composition type discrete impedance elements having a predetermined nominal value within relatively narrow tolerances, e.g., within 1 percent of the prescribed nominal value. This difficulty is related to the fact that the discrete volumetrically fixed impedance elements normally are not adjustable after being manufactured. It will be understood, therefore, that expensive and stringent production controls must be exercised during the manufacture of discrete impedance elements and that it would be desirable to provide impedance elements that may be easily and economically adjusted to a predetermined nominal value within prescribed tolerances. It is also desirable, in any given section of a multi-impedance component, that each impedance element exhibit substantially the same changes in electrical characteristics for a given environmental change. In the particular case of resistors one of these characteristics, known in the art as temperature coefficient of resistance (TC), is defined as the number of parts change, per million, of the ohmic value of the resistor per degree centigrade. In applications requiring that several resistors exhibit specified nominal resistive values to a high degree of precision under varying environmental conditions, it is of great importance that the TC of each of the resistors be substantially the same. Accordingly, it would be desirable to provide an improved multi-impedance electrical component wherein changes in the characteristics of the impedance elements in response to environmental changes can be expected to be uniform from one impedance element to another without concomitant increased costs.

It is generally recognized that manufacturers of electrical and electronic equipment incorporating multi-impedance electrical components consider it to be increasingly desirable to concentrate the responsibility for the quality of a maximum number of components in a single source of supply. Therefore, it would be desirable to provide an improved multi-impedance component wherein the responsibility for the quality of a plurality of operationally discrete impedance elements and an operating mechanism for the component can be concentrated in a single source of supply. It would also be desirable to provide a multi-impedance component having an impedance selecting means and a plurality of impedance elements wherein the necessity of individually designing, fabricating, testing, and interconnecting a plurality of impedance elements with the impedance selecting means can be substantially eliminated.

Accordingly, it is an object of the present invention to provide a multi-impedance electrical component comprising an impedance selecting means and a plurality of operationally discrete impedance elements wherein the manually completed complex interconnections between the impedance selecting means and the impedance elements are greatly simplified. It is another object of the present invention to provide an improved multi-impedance electrical component wherein a plurality of operationally discrete impedance elements may be economically produced with close tolerances and wherein the impedance elements exhibit little or no change in operational characteristics due to ageing or changes in environmental conditions. Still another object of the present invention is to provide an improved multi-impedance electrical component whereby responsibility for the quality of the component may be concentrated in a single source of supply. A further object of the present invention is to provide an improved multi-impedance electrical component wherein a plurality of impedance elements are deposited on a single circuit wafer thereby to substantially eliminate the individual design and fabrication of operationally discrete impedance elements. It is a more specific object of the present invention to provide a multi-impedance electrical component having an impedance selecting means and a plurality of operationally discrete resistors each having substantially the same temperature coefficient of resistance and being particularly adapted for fabrication to precise resistive values.

These and other objects are accomplished in accordance with one form of the present invention by providing a multi-impedance electrical component comprising an impedance selecting means assembled with at least one circuit wafer, the circuit wafer in turn supporting a plurality of operationally discrete film type impedance elements and a plurality of conductive interconnectors connected with the impedance elements. The impedance selecting means, in a preferred form, includes a frame, an impedance selector comprising a bridging means, and driver means for moving the bridging means. The bridging means may take the form of a conductive contactor selectively moveable to different contact positions for completing an electrical connection between selected ones of the impedance elements or between one or more impedance elements and a collector connected to a termination point of the control. The impedance selecting means further includes an actuator in the form of a shaft drivingly engaging the driver means as well as means in the form of an indexical detent mechanism that establishes index positions for the shaft, the index positions corresponding to the contact positions of the conductive contactor. Assembled with the impedance selecting means is a circuit wafer having operationally discrete film type impedance elements and conductive interconnectors supported thereon. Impedance terminating portions of the conductive interconnectors are connected to the impedance elements and second portions of the conductive interconnectors are supported on the circuit wafer in a spatial array for selective connection with the conductive contactor. The circuit wafer is formed of an electrically non-conductive material and the operationally discrete film type impedance elements are formed by depositing a resistance material onto a surface of the wafer to form, after firing, a resistance film. After assembly of the impedance selecting means with the circuit wafer, rotation of the shaft to various index positions connects one or more preselected impedance elements in an electrical circuit between termination points on the component. In one of the more specific aspects of the invention, the operationally discrete impedance elements are adjusted to a nominal impedance value by removing portions of the resistance film from the circuit wafer to form denuded areas on the circuit wafer contiguous to the impedance elements. The size and location of the denuded areas determine, within desired tolerances, the nominal magnitude of the impedance of the element contiguous thereto.

The subject matter which I regard as my invention is set forth in the appended claims. The invention itself, however, together with other objects and advantages thereof may be better understood by referring to the following description taken in connection with the accompanying drawings.

Figure 1:
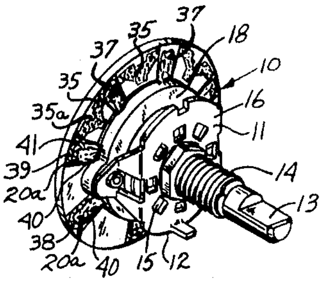
FIG. 1 is an isometric view of a multi-impedance electrical component embodying the invention.
Figures 2, 6:
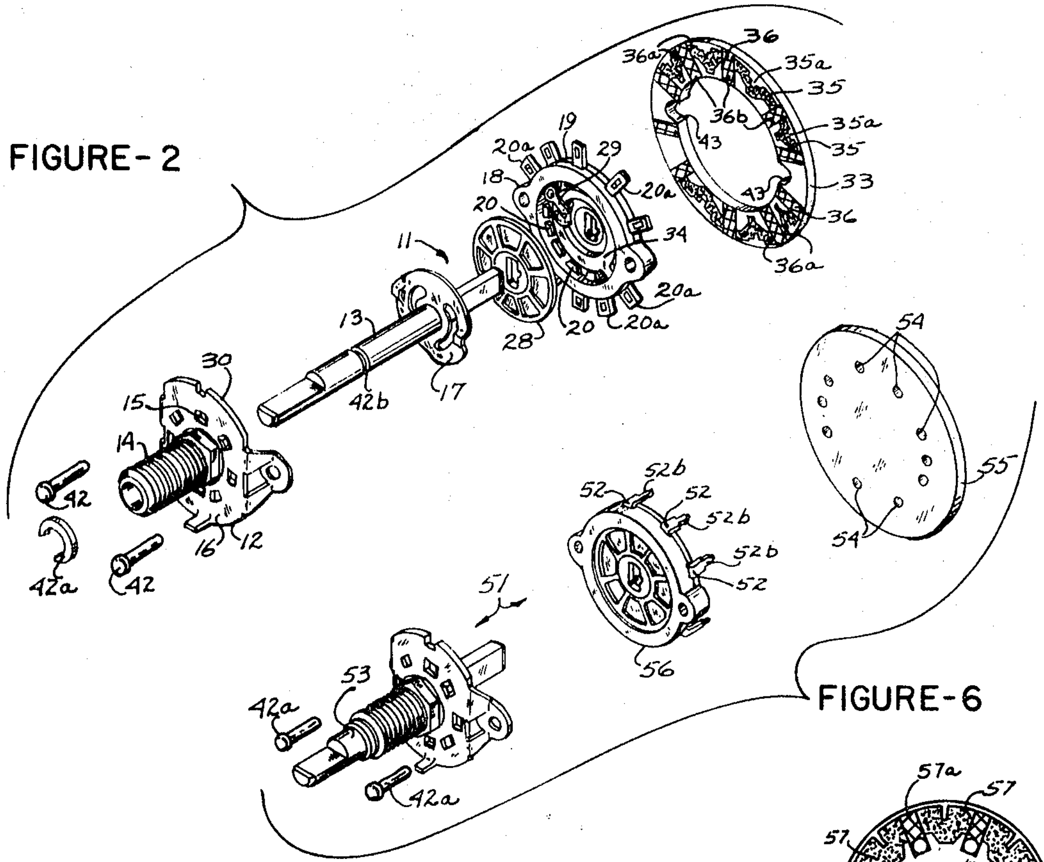
FIG. 2 is an exploded view of the component of FIG. 1.
FIG. 6 is an exploded view of the component of FIG. 4.

Referring now more particularly to the drawings, a multi-impedance electrical component embodying the present invention is generally identified by the reference numeral 10. As best shown in FIGS. 1 and 2 of the drawings, the component 10 comprises a plurality of operationally discrete impedance elements deposited on a circuit wafer, an impedance selecting means 11 that includes a frame 12, an actuator in the form of a shaft 13 journaled in a bushing 14 provided for securing the component 10 to a not-shown mounting panel, an indexical detent means that includes a plurality of protuberances 15 on the front plate 16 of frame 12 and a spring index plate 17 keyed to the shaft 13. The impedance selecting means 11 also includes an impedance selector 18 comprised of an insulative stator body 19 carrying a center collector and a plurality of stationary contact pads 20 with terminals 20a projecting therefrom. Rotatably supported on the stator body 19 is a driver means that includes a rotor 28 keyed to the shaft 13 and drivingly engaged with a bridging means illustrated as a conductive contactor 29 movable into selectable contact positions for making wiping contact with the contact pads 20. The index positions of the shaft 13 are determined by the recessed areas 30 on the front plate between the protuberances 15 on front plate 16 and correspond to the contact positions of the selector 18. Although the selector 18 illustrated in FIGS. 1 and 2 is similar to the switch disclosed in U.S. Pat. No. 2,988,606 issued to Allison on June 13, 1961, and owned by the assignee of the present invention, it will be understood that different types of impedance selectors may be used in the practice of the present invention. For example, it may be desirable in some applications to dispense with the individual contact pads 20 carried by the stator body and design the bridging means to wipingly engage conductive pads deposited on or otherwise carried by the circuit wafer 33. In this event, it is then also desirable to support a conductive film or other type of center collector on the wafer and dispense with the collector 34 carried by the stator body 19. The use of deposited conductive pads and/or a deposited center collector can, in many instances, result in decreased manufacturing costs. However, the illustrated embodiments of the invention are presently preferred because the desirable qualities of a ceramic substrate supporting operationally discrete impedance elements are attained without subjecting the contactor 29 to the abrading action that might result from the use of deposited conductive pads formed from relatively abrasive cermet or other materials.

The circuit wafer 33 is formed from an electrically non-conductive material such as steatite or alumina ceramic and has screened thereon a plurality of operationally discrete impedance elements illustrated as cermet film resistors 35. In the present application, "operationally discrete impedance elements" is meant to define film type impedance elements that are supported in groups on a supporting surface to form a single integrated mechanical structure, and that may be used in an electrical circuit in lieu of structurally independent discrete resistors, capacitors, and inductors. The operationally discrete resistors 35 may be sprayed, brushed, rolled, sputtered, vacuum deposited, or screened onto the wafer 33 in any of the manners well known in the art and may consist of cermet material, carbon composition, or other suitable materials. After firing, the film forming the resistors 35 will normally be between one-tenth of a mil and 3 mils thick when cermet material is used, the thickness depending of course on the specific material used and the final desired resistive value. The illustrated cermet resistors 35 are screened onto the circuit wafer 35 substantially simultaneously before being fired at a temperature normally in excess of 370° Centigrade. Thus all of the resistors 35 are formed from the same batch of resistive material and exhibit essentially uniform characteristics. By fabricating the circuit wafer 33 in this manner, an ultimate user of the multi-impedance component 10 will also be virtually assured that each of the resistors 35 will be characterized by the same stability, impermeability to water vapor, temperature coefficient of resistance, and voltage coefficient of resistance which is defined as the change in ohmic value of a resistor for an incremental change in voltage applied across the resistor.

For a given resistive formulation and a given set of process controls governing the firing temperature and firing time of the circuit wafer 33, the ohmic value of the individual resistors 35 is determined primarily by the geometric configuration of each resistor. Accordingly, the ohmic value of the resistors 35 is adjusted after firing by changing the geometry of the resistors by removing portions of the resistance film from the wafer 33 in order to denude areas of the wafer contiguous to the resistors. Whether it is desired for the resistors 35 to each have different ohmic values or the same ohmic value, the resistors 35 are initially designed to have ohmic values less than nominal. The actual resistance of each resistor is then increased to a desired nominal value within any desired tolerance or degree of precision by denuding areas 35a of the wafer surface contiguous to the resistors 35 by removing a portion of the resistive material. As will be understood by persons skilled in the art, when a sandblast is used to abrade and remove portions of the film during the denuding process it may be desirable to apply a glaze coat over the wafer in order to protect the impedance elements and interconnectors from the abrasive sand particles. By adjusting the resistors in the above described manner, the cost of such adjustment depends upon the economics of the denuding step and is essentially fixed rather than being dependent on the maintenance of stringent production controls, the total cost of which tends to vary with the amount of control exercised in each of the individual manufacturing steps.

The conductive interconnectors 36 are deposited on the circuit wafer 33 prior to the deposition of the resistor and by the process used for depositing the resistors 35 onto the circuit wafer 33. An impedance terminating portion 36*a* of each of the interconnectors may either abut or slightly overlap the resistors 35 with a second portion 36*b* of each of the interconnectors 36 arranged in a desired spatial array. In the illustrated embodiment, the desired array constitutes intermittent portions of an arcuate path on the circuit wafer 33. The particular geometry of the array used is determined by the pattern of the terminals 20*a* and the terminals are connected to the interconnections 36 by any suitable means such as solder 37. It will of course be understood that when the impedance selector 18 does not include contact pads and terminals the contactor 29 will wipingly engage the interconnectors 36 and the path traced by the conductive contactor 29 will determine the spatial array of the interconnectors 36. It will also be understood that when the interconnectors 36 are used as conductive contact pads, the stator body 19 may be supported on a central surface area of the circuit wafer or in a bore extending through the central portion of the circuit wafer.

In order to facilitate the connection of the component 10 with the not-shown circuits of apparatus incorporating the component 10, termination points 38 and 39 are provided on the circuit wafer 33. Each of the termination points consists of the same conductive solderable cermet material used to form the conductive interconnectors 36 and any suitable means may be used to complete the connection between the termination points 38 and 39 and the aforementioned circuits. As illustrated, the termination point 38 is connected to the center collector 34 through a terminal 20*a* and the termination point 39 is connected at 41 to one of the resistors 35. Therefore, as will be understood, the selector 18 is operative to select the total number of resistors 35 that will be connected in series between the termination points 38, 39. It will also be understood that since the conductive interconnectors 36 are solderable, they may be used as solder pads for making a tap connection to the component 10.

Assembly of the frame 12 and impedance selector 18 is secured by suitable fastening means such as rivets 42 and C-ring 42*a* that snaps into the groove 42*b* in shaft 13. The relieved portions 43 on the wafer 33 provide a clearance for the fastening means so that the selector 18 can be positioned snugly against the circuit wafer 33, and so that the selector 18 can be secured to the wafer with the solder 37.

Figure 3:
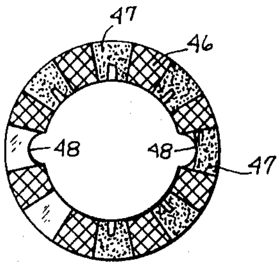
FIG. 3 illustrates a different embodiment of a circuit wafer that may be used with the component of FIG. 1.

In FIG. 3, a circuit wafer 46 is illustrated that may be interchanged with the circuit wafer 33 to form the multi-impedance component 10. The circuit wafer 46 is substantially identical to the circuit wafer 33 with the exception that the resistors 47 carried on wafer 46 have a somewhat different geometrical configuration that the resistors 35 carried by the wafer 33. The relieved portions 48 of the wafer 46 are designed to provide a clearance in the same manner as relieved portions 43 on circuit wafer 33.

Figure 4:
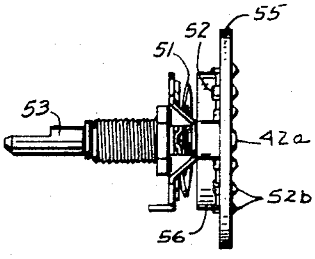
FIG. 4 is a side elevation of another component embodying the invention.
Figure 5:
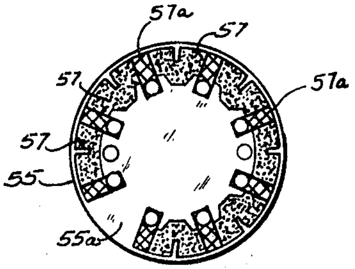
FIG. 5 is a rear elevation of the component shown in FIG. 4.

Now having reference to FIGS. 4–6, it will be recognized that the impedance selecting means 51 of the component 50 is substantially identical to the impedance selecting means 11 illustrated in FIGS. 1 and 2 with the exception that the terminals 52 have end portions 52*b* formed so as to be generally parallel to the rotational axis of the shaft 53. Thus, the end portions 52*b* of the terminals 52 are positionable in the passageways 54 formed in the circuit wafer 55. The resistors 57 are carried on the rear surface 55*a* of the wafer 55 and, as best shown in FIG. 5, the end portions 52*b* of the terminals 52 are swaged against the surface of the circuit wafer and soldered to the conductive interconnectors 57*a* to secure assembly of the selector 56 and the wafer 55. The rivets 42*a* are used to secure assembly of the selector 56 and the remainder of the selecting means 51.

Figure 7:
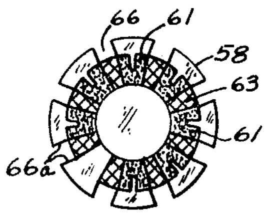
FIG. 7 illustrates another embodiment of a circuit wafer that may be used with the component of FIG. 4.
Figure 8:
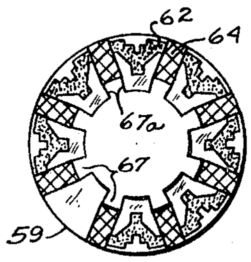
FIG. 8 illustrates still another embodiment of a circuit wafer that may be used with the component of FIG. 4.

FIGS. 7 and 8 illustrate modified circuit wafers 58 and 59 that may be used in combination with the impedance selecting means 51. In both embodiments, the resistive elements 61, 62 and interconnectors 63, 64 are screened onto the circuit wafers. When the circuit wafer 58 is assembled with the selecting means 51, the end portions 52*b* of terminals 52 fit in the passageways 66 and cooperate with the walls 66*a* of the passageways to prevent relative rotation between the circuit wafer 58 and impedance selecting means 51. When the circuit wafer 59 is used with the selecting means 51, the walls 67*a* of passageways 67 cooperate with the end portions 52*b* of terminals 52 in a similar manner. When desired, components embodying the present invention may be fabricated with a plurality of circuit wafers. In such an event, the circuit wafers for each component are stacked in spaced relationship and the actuator is operatively connected with conductive contactor associated with each circuit wafer. When a plurality of circuit wafers are stacked in this manner it is preferable to use wafers having a bore therethrough so that a simple shaft type of actuator may be used.

In view of the foregoing, it will be appreciated that the teachings of the present invention provide an improved multi-impedance component economical to produce and characterized by improved reliability and stability. It will also be appreciated that the impedance selecting means used in the practice of the present invention may be of the linear or rotary type and may consist of only an actuator, a driver, and a bridging contactor.

While there has been described and illustrated what is at present considered to be the preferred embodiments of the present invention, it will be appreciated that numerous changes and modifications are likely to occur to those skilled in the art, and it is intended in the appended claims to cover all those changes and modifications which fall within the true spirit and scope of the present invention.

What I claim as new and desire to secure by Letters Patent of the United States is:

1. A multi-impedance electrical component comprising at least one circuit wafer, a plurality of discrete film type impedance elements supported on and bonded to the circuit wafer, said impedance elements being spaced from each other and lying in a resistance path, a plurality of conductive interconnectors having an impedance terminating portion electrically connected to said impedance elements, each of the conductive interconnectors having second portions supported flatwise on the circuit wafer in a desired spatial array, a rotary impedance selecting means assembled with the circuit wafer, the impedance selecting means comprising a conductive contactor and a driver means for selectively moving the conductive contactor in a circuitous path to different preselected contact positions and electrically connecting the contactor to one of the interconnectors, the second portions of the conductive interconnectors being spaced at intervals along an arcuate path on the circuit wafer, the impedance elements being supported on the circuit wafer radially outwardly of the arcuate path and spaced from the circuitous path engageable by the conductive contactor to present wiping engagement of the conductive contactor with the impedance elements lying in the resistance path when the contactor is moved from one of the interconnectors to another of the interconnectors, and an impedance selecting means actuator connected to the driver means for imparting motion thereto.

2. The electrical component of claim 1 wherein the circuit wafer is provided with at least one denuded area contiguous with one of the discrete film type impedance elements, the size and location of the denuded area determining the nominal magnitude of the electrical impedance of the contiguous impedance element.

3. The structure of claim 1 wherein the component includes a pair of termination points, the impedance selecting means includes an indexical detent means having index positions corresponding to the different preselected contact positions of the conductive contactor and the film type impedance elements are connected in a series circuit configuration by the conductive interconnectors, movement of the conductive contactor between two of the preselected contact positions in one direction increasing the number of impedance elements effectively in the electrical circuit between the pair of termination points, and movement of the conductive contactor in the opposite direction between two of the preselected contact positions decreasing the number of impedance elements effectively in the electrical circuit between the pair of termination points.

4. An electrical component having a frame, a shaft supported for rotation by the frame, a circuit wafer held fixed relative to the frame, a plurality of discrete film type impedance elements supported flatwise on and bonded to the circuit wafer, said impedance elements being spaced from each other and lying in a resistance path, a first termination means electrically connected to at least one of the discrete film type impedance elements, a second termination means electrically connected to another of the discrete film type impedance elements and spaced from the first termination means, a plurality of conductive interconnectors supported on the wafer, the conductive interconnectors being electrically connected to the discrete film type impedance elements, and a selector having a conductive contactor drivingly interconnected with the shaft for movement thereby, the impedance elements being supported on the circuit wafer radially outwardly of the selector to prevent wiping engagement of the conductive contactor with the impedance elements lying in the resistance path when the contactor is moved from one of the interconnectors to another of the interconnectors, said selector having means electrically connected to said second termination means and movable to a preselected contact position for completing an electrical circuit between said one of the conductive interconnectors and the second termination means whereby said at least one of the discrete film type impedance elements is connected in an electrical circuit between said first and second termination means.

5. The electrical component of claim 4 wherein the circuit wafer is provided with at least one denuded area contiguous with one of the discrete film type impedance elements, the size and location of the denuded area determining the nominal magnitude of the electrical impedance of the contiguous impedance element.

6. The electrical component of claim 4 wherein the selector includes a rotor supported for rotation relative to the circuit wafer and the rotor comprises bridging means for completing the electrical circuit between said one of the conductive interconnectors and the second termination means.

7. The electrical component of claim 6 wherein the selector further comprises a stator body of insulating material and a plurality of terminals supported on the stator body with end portions thereof projecting therefrom, the rotor is supported for rotation on the stator body, the bridging means comprises a contactor engageable with the terminals, and the end portions of the terminals are electrically connected to the conductive interconnectors.

8. The electrical component of claim 7 wherein the circuit wafer is provided with a plurality of passageways, and the end portions of the terminals are disposed in the passageways and cooperate therewith to mechanically hold the stator body in fixed relation to the circuit wafer.

* * * * *